Patented Nov. 14, 1950

2,530,353

UNITED STATES PATENT OFFICE 2,530,353

THERMOSTABLE POLYMERIC VINYLIDENE CHLORIDE COMPOSITION

Carl B. Havens, Hope, Mich., assignor to The Dow Chemical Company, Midland, Mich., a corporation of Delaware No Drawing. Application May 7, 1949, Serial No. 92,069

4 Claims. (Cl. 260—45.8)

The invention relates to compositions of matter containing polymeric vinylidene chloride products and stabilizing agents to protect the polymeric products from thermal decomposition.

The polymer of vinylidene chloride and many of its copolymers have been described in patents and in other literature during recent years. Such polymeric bodies, and compositions containing them, are herein referred to as polymeric vinylidene chloride products. It has been found that such products tend to darken after prolonged exposure to elevated temperatures. This darkening is accompanied by a change in other physical properties of the polymeric product and is assumed to be an evidence of partial decomposition. Because of the many desirable properties of polymeric vinylidene chloride products, a means is sought to overcome or to prevent the tendency for such products to decompose on heating.

It is, accordingly, among the objects of the present invention to provide a composition of matter comprising a polymeric vinylidene chloride product stabilized against the decompositional effects of heat. A related object is to provide a heat stabilizer for polymeric vinylidene chloride products.

It has now been found that the foregoing and related objects may be attained through the incorporation in polymeric vinylidene chloride products of small amounts, generally in the range of from about 1 to about 20 per cent by weight, of an epoxypropyl ether of a bisphenol, said ether having the general formula

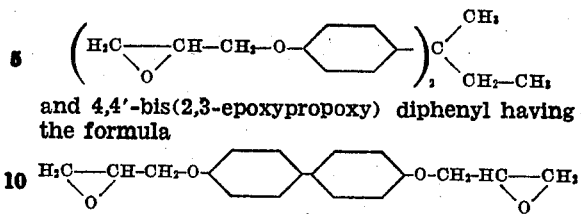

wherein R is an aliphatic hydrocarbon bridge, each $n$ independently has one of the values 0 and 1, and X is an alkyl radical containing from 1 to 4 carbon atoms. Compounds of this class include: 2,2-bis(4-(2,3-epoxypropoxy) phenyl) propane having the formula

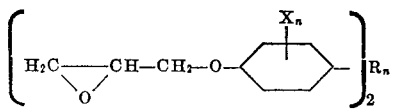

2,2-bis((4-(2,3-epoxypropoxy) 3-methyl phenyl)) propane having the formula

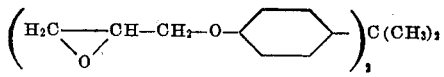

2,2-bis((4-(2,3-epoxypropoxy) phenyl)) butane having the formula

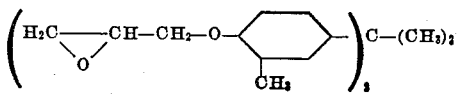

and 4,4'-bis(2,3-epoxypropoxy) diphenyl having the formula

H₂C——CH-CH₂-O-⟨⟩-⟨⟩-O-CH₂-HC——CH₂
   \O/                                     \O/

In the last named compound, both occurrences of the letter "$n$" in the general formula have the value "0."

The compounds of the above class have been found useful in stabilizing polymeric vinylidene chloride products for fabrication into films and other articles by hot extrusion or molding operations. They are also useful in preparing odorless thermostable plastic articles which are relatively non-toxic both orally and dermally.

By way of example, several polymers and copolymers of vinylidene chloride were each mixed with one of the above-defined heat stabilizers on a cold mill. A standard weight of each such stabilized product was heated at 180° C. and the elapsed time (in minutes) was noted before a rapid evolution of hydrogen chloride gas occurred in each case. For convenience, this elapsed time is referred to as the "T-value." A high T-value indicates a thermally stable composition and a low one a thermally unstable composition. For the sake of brevity, various vinylidene chloride copolymers are represented in the examples to follow by the letters A, B, C and D. The letter A refers to a copolymer of about 85 per cent vinylidene chloride and about 15 per cent vinyl chloride, B refers to one of about 73 per cent vinylidene chloride and about 27 per cent vinyl chloride, C refers to one of about 95 per cent vinylidene chloride and about 5 per cent acrylonitrile, and D refers to the polymer of vinylidene chloride alone. Each of the "A" compositions reported in the table below, except the blank, contains 10 per cent by weight of the particular heat stabilizing agent.

| Heat Stabilizer | Copolymer | Average T-values |
|---|---|---|
| 2,2-bis ((4-(2,3-epoxypropoxy) phenyl)) propane | A | 19 |
| 2,2-bis ((4-(2,3-epoxypropoxy) 3-methylphenyl)) propane | A | 14 |
| 2,2-bis ((4-(2,3-epoxypropoxy) phenyl)) butane | A | 14 |
| 4,4'-bis (2,3-epoxypropoxy) diphenyl | A | 19 |
| Blank | A | 4 |

Other average T-values obtained by heating compositions of polymers "C" and "D" with 10 per cent by weight of 2,2-bis((4-(2,3-epoxypropoxy) phenyl)) propane were 11 and 17, respectively, as compared to values of 1 and 2 obtained by heating these copolymers without said heat stabilizer. A similar composition of polymer "D" and 20 per cent of 2,2-bis((4-(2,3-epoxypropoxy) phenyl)) propane had a T-value of 22. To illustrate further, compositions of copolymer "B," containing 5 per cent of dibutyl phthalate, some of which also contained 5 per cent of 2,2-bis(4 - (2,3 - epoxypropoxy) phenyl)) propane gave average T-values of 4 and 24, respectively. Other tests have indicated that the amount of heat stabilizer may be as little as 1 per cent, especially when thermal conditions to be encountered by the composition are not extreme. In no case has it been found advantageous or desirable to employ more than 20 per cent of those compounds for their stabilizing effect, and, in most cases, 10 per cent is enough for the purpose.

In addition to the stabilizers of the illustrative examples, compounds conforming to the general formula which are useful in the invention include:

2,2-bis((4 -(2,3 - epoxypropoxy)  2-tertiarybutyl phenyl)) propane
2,2 - bis((4 - (2,3 - epoxypropoxy)  3 - isopropyl phenyl)) butane
3,3-bis((4-(2,3-epoxypropoxy) phenyl)) hexane
Bis((4-(2,3-epoxypropoxy) phenyl)) methane
4,4'- bis(2,3 - epoxypropoxy)  3,3'- dimethyl diphenyl
2,2-bis((4-(2,3-epoxypropoxy) 2-ethyl phenyl)) butane The invention is not limited to the use of the disclosed compounds in the particular copolymers of the examples, but is applicable generally to all polymeric vinylidene chloride compositions which tend to darken and decompose when heated, prolonging in each case the useful life of the polymer under exposure to heat.

I claim:

1. A composition of matter comprising a polymeric vinylidene chloride product which tends to decompose when heated, and, as a heat stabilizing agent therefor, from 1 to 20 per cent by weight of a compound having the general formula

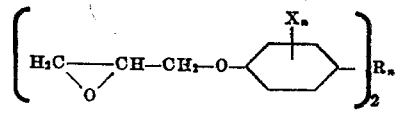

wherein R is an aliphatic hydrocarbon bridge, each $n$ independently has one of the values 0 and 1, and X is an alkyl radical containing from 1 to 4 carbon atoms.

2. A composition of matter comprising a polymeric vinylidene chloride product which tends to decompose when heated, and, as a heat stabilizing agent therefor, from 1 to 20 per cent by weight of 2,2 - bis((4 -(2,3 - epoxypropoxy) phenyl)) propane.

3. A composition of matter comprising a polymeric vinylidene chloride product which tends to decompose when heated, and, as a heat stabilizing agent therefor, from 1 to 20 per cent by weight of 2,2 - bis((4 -(2,3 - epoxypropoxy) phenyl)) butane.

4. A composition of matter comprising a polymeric vinylidene chloride product which tends to decompose when heated, and, as a heat stabilizing agent therefor, from 1 to 20 per cent by weight of 4,4'-bis(2,3-epoxypropoxy) diphenyl.

CARL B. HAVENS.

REFERENCES CITED

The following references are of record in the file of this patent:

UNITED STATES PATENTS

| Number | Name | Date |
|---|---|---|
| 2,371,500 | Britton et al. | May 13, 1945 |